US 7,406,626 B2

United States Patent
Shen et al.

(10) Patent No.: US 7,406,626 B2
(45) Date of Patent: Jul. 29, 2008

(54) TEST AGENT ARCHITECTURE

(75) Inventors: Lei Shen, Sudbury, MA (US); Richard C. Kuzsma, Jr., Nashua, NH (US); Michael Glik, Newton, MA (US)

(73) Assignee: Empirix Inc., Bedford, MA (US)

( * ) Notice: Subject to any disclaimer, the term of this patent is extended or adjusted under 35 U.S.C. 154(b) by 607 days.

(21) Appl. No.: 11/150,020

(22) Filed: Jun. 10, 2005

(65) Prior Publication Data

US 2006/0117222 A1 Jun. 1, 2006

Related U.S. Application Data

(60) Provisional application No. 60/627,492, filed on Nov. 12, 2004.

(51) Int. Cl.
*G06F 11/00* (2006.01)
(52) U.S. Cl. .......................... 714/38; 709/219
(58) Field of Classification Search .................. 714/37, 714/38, 39, 47
See application file for complete search history.

(56) References Cited

U.S. PATENT DOCUMENTS

| | | | | |
|---|---|---|---|---|
| 6,470,383 B1 * | 10/2002 | Leshem et al. | .............. | 709/223 |
| 6,477,483 B1 * | 11/2002 | Scarlat et al. | ............... | 702/186 |
| 6,530,039 B1 * | 3/2003 | Yang | ............................ | 714/38 |
| 6,549,944 B1 * | 4/2003 | Weinberg et al. | ........... | 709/224 |
| 6,560,564 B2 * | 5/2003 | Scarlat et al. | ............... | 702/186 |
| 6,738,933 B2 * | 5/2004 | Fraenkel et al. | ............... | 714/47 |
| 2005/0137844 A1 * | 6/2005 | Voruganti | ...................... | 704/2 |

* cited by examiner

*Primary Examiner*—Nadeem Iqbal
(74) *Attorney, Agent, or Firm*—Chapin IP Law, LLC; Barry W. Chapin, Esq.

(57) ABSTRACT

A method, apparatus and computer program product for generating a test script for use by a test agent is presented. A first test script is generated in a first language. A determination is then made whether to generate an intermediate test script from the first test script. When the determination is made not to generate an intermediate test script then the first test script is converted into a second test script in a second language, and the first test script is also converted into a callback test script. When the determination is made to generate an intermediate test script then an intermediate test script is generated from the first test script. The intermediate test script is converted into a second test script in a second language, and the intermediate test script is converted into a callback test script. The second test script and the callback test script are compiled into a final test script.

15 Claims, 4 Drawing Sheets

TEST AGENT ARCHITECTURE

CROSS REFERENCE TO RELATED APPLICATIONS

The present application claims the benefit of U.S. Provisional Patent Application No. 60/627,492, filed on Nov. 12, 2004, which is incorporated herein by reference in its entirety.

BACKGROUND

Computers have been applied as test computers to test various applications and systems such as websites, object oriented software components, Interactive Voice Response Systems (IVRs) and contact centers.

Virtual web user systems have been provided that are programmed in a variety of ways. For example, an E-test™ virtual web user system from EMPIRIX®, Inc. of Bedford, Mass., can be programmed in Visual Basic. The Visual Basic program can include test scripts that cause the virtual web user system to perform a sequence of tests of the web server. For example, the test scripts can be associated with simulated web user queries to the web server, such as simulated mouse clicks or simulated data entry, for example a name and an address, made by a web user.

Web servers can be tested in a variety of test contexts, and the virtual web user system has been applied to the variety of test contexts. One test context is referred to as functional testing which is defined as the testing generally performed before the web server is released to the public in order to verify that the web server hardware and/or software is functioning properly.

Another test context is known as load testing which is generally defined as the testing generally performed while the web server hardware and software is in public use to verify that the web server hardware and/or software can accommodate at least a certain number of simultaneous web users. Alternatively, the load testing can be performed while the web server is not in public use. In load testing, it is desirable to provide a large number of virtual web users to test the delay time latencies that can be caused by many simultaneous web users.

Yet another test context is known as monitoring testing which is testing that is generally performed while the web server is in public use to verify that the web server hardware and/or software is operational. The monitoring testing may be performed in an automatic background mode wherein the monitoring testing is run at predetermined time intervals to ensure the web server is running properly.

Each of the functional testing, the load testing, and the monitoring testing, has different requirements. For example, a designer of the web server system using a functional test may want to test each possible path through the variety of branching web access options presented to a web user on a web page. In functional testing it may only be necessary to provide a single virtual web user, which exercises, in sequence, most or all of the possible paths through the web page. For another example, a test manager using a load test may want to test only some of the variety of paths through the web page. For yet another example, a test manager using a monitoring test may want to minimally test the general operation of the software application from time to time. In monitoring testing it may only be necessary to provide a single virtual web user, and exercise one or a small number of paths through the web page.

Componentized software is software that is designed to allow different pieces of the application, or "objects", to be created separately but still to have the objects work together. For this to happen, the objects must have standard interfaces that can be understood and accessed by other objects. The software language enforces some parts of these interfaces. If software interfaces are not directly available as part of the system, a discovery mechanism is employed to find the interface information. If the interfaces are not used, the software objects will not be able to work with other objects. Other practices are imposed by convention. Because these programming practices are known to everyone, the companies that create the containers can rely on them when creating the container. As a result, if these practices are not followed, the container might not operate properly. Thus, there is an indirect mechanism for enforcing these practices.

Test code can be generated by using the attributes of the platform independent language in which the software is written. Using the reflection, a program can determine what are known as the "properties" and "methods" of a bean. The properties of a bean describe the data types and attributes for a variable used in the bean. Every variable used in the bean must have a property associated with it. In this way, the software can automatically determine what methods need to be exercised to test a bean and the variables that need to be generated in order to provide stimulus to the methods.

The methods of a bean describe the functions that bean can perform. Part of the description of the method is the properties of the variables that are inputs or outputs to the method. A second part of the description of each method—which can also be determined through the reflection interface—is the command needed to invoke this method. The detailed description of the method's name, parameters and return value is specified in Remote or Home interfaces and can be also determined with Reflection API available in Java language itself. Because software can determine the code needed to invoke any method and can generate data values suitable to provide as inputs to that method, the software can generate code to call any method in the bean.

Contact centers are known to those of ordinary skill in the art as those systems to which a person can communicate to receive information. Such communication can include, but is not limited to, telephone calls, Internet access, email, and FAX. A contact center can include one or more interactive voice response (IVR) applications, which can be run across one or more IVR systems. The one or more IVRs provide automatic branching voice queries to which the caller responds with button pushes on a telephone keypad or with voice responses on a telephone. The contact center is provided having only the one or more IVR systems, or alternatively, it is also provided having human agents. For example, at the end of the IVR branching voice queries, the caller can be directed to press zero to speak to an agent. The agent is a person having a telephone to talk to the caller, hereafter referred to as an "agent telephone," and a computer to access information about the caller, hereafter referred to as an "agent computer." Note that though the agent telephone and the agent computer are often associated with one person, they correspond to distinct electronic systems and will be separately referred to herein.

The contact center can also include one or more database server computers, one or more database storage areas, one or more web server computers, and one or more email server computers. Various testing systems have been provided to test functions associated with the contact center. For example, the HammerIT™ from Empirix, Inc. of Bedford, Mass., can be used to simulate telephone callers in a public switched telephone network (PSTN) having one or more telephone callers who access the contact center either sequentially or in parallel. The HammerIT™ system provides a "virtual telephone caller system" having "virtual telephone callers" that can exercise and test the responses of the one or more IVR systems. The virtual telephone caller system can also be used to test the agent telephone functions of the contact center, providing a "virtual agent telephone system" having "virtual agent telephones." The virtual telephone caller system can also be used to test FAX functions of the contact center.

Various testing systems have also been provided to test the agent computer function of the contact center. For example, the E-test™ system from the Empirix Inc. can be used to simulate the computer functions of the agent computer, providing a "virtual agent computer system" having "virtual agent computers." The E-test™ system can also provide a "virtual web user system" having "virtual web users" that include simulations of people who access web pages on a web server within the contact center, people who send/receive email associated with an email server within the contact center, and people who send/receive FAX information associated with a FAX system within the contact center. The virtual telephone caller systems, virtual agent telephone systems, virtual agent computer systems, and virtual web user systems will hereafter be referred to as "virtual test systems."

Virtual telephone caller systems have been provided that are programmed in a variety of ways. For example, the HammerIT™ virtual telephone caller system described above can be programmed in Hammer Visual Basic. The Hammer Visual Basic program corresponds to a test script that causes the virtual telephone caller system to perform a sequence of programmed tests of the contact center, and in particular, test of the one or more IVR systems within the contact center. For example, the test script can be associated with simulated telephone caller queries to the IVR, such as simulated telephone keypad button pushes or telephone caller voice commands.

Alternatively, a graphical user interface (GUI) can be provided that allows the user to program the virtual telephone caller system using graphical icons that can be connected together in a "call flow diagram." Such graphic user interfaces provide automatic test generation. For example, the Hammer CallMaster™ software system from Empirix, Inc. of Bedford, Mass., allows the user to interconnect icons on a graphical display, each icon representing an action (or set of actions) to be taken by the virtual telephone caller system, and the interconnections corresponding to a sequence of actions. The call flow diagram results in the automatic generation of the test script described above.

Call flow diagrams are created using a graphical call flow editor in conjunction with a standard library of call flow icons. Each call flow icon is associated with test code necessary to execute the call flow action and an appropriate set of default telephony parameters. These parameters can be overridden on either a global or instance basis. Users can also specify the data to be used in the tests.

Automatic test generation software, is provided, (for example, as part of the Hammer CallMaster™ software system described above), that can exercise the variety of branches through the call flow diagram in a way prescribed by the user. The automatic test generation software eliminates the tedious, unreliable and time-consuming process of manual test design and execution by giving users the power to automatically generate and execute tests derived from a call flow diagram.

By way of the automatic test generation software, test developers create automated tests simply by generating the call flow diagram. Using automatic test generation technology, the software then automatically generates a set of test scripts that are used to exercise all or part of the call flow paths and data in the call flow diagram. Under user control, tests can be generated to do focused testing of a new feature, or general regression testing of the entire application. The same tests can be used for post-deployment monitoring and maintenance to ensure that the application continues to deliver the highest possible level of performance.

SUMMARY

Conventional mechanisms such as those explained above suffer from a variety of deficiencies. One such deficiency is that conventional test scripts are difficult and time consuming to generate and also difficult to maintain as the system or application being tested changes from time to time.

Embodiments of the invention significantly overcome such deficiencies and provide mechanisms and techniques that provide for test script generation.

In a particular embodiment of a method for generating a test script fo ruse by a test agent, a first test script is generated in a first language and converted into a second test script in a second language. The first test script is also converted into a callback test script in the second language. The second test script and the callback test script are converted into a final test script in the second language, and a predetermined quantity of the final test scripts are run with a controller having an interface compatible with said second language.

Another embodiment of a method of generating a test script for use by a test agent includes generating a first test script in a first language. An intermediate test script is then generated in the first language from said first test script. The intermediate test script is converted into a second test script in a second language, and is also converted into a callback test script in the second language. The second test script and the callback test script are converted into a final test script in the second language, and a predetermined quantity of the final test scripts are run with a controller having an interface compatible with the second language.

Other embodiments include a computer readable medium having computer readable code thereon for providing a method of generating a test script for use by a test agent. The medium includes instructions for generating a first test script in a first language and instructions for converting the first test script into a second test script in a second language. The medium further includes instructions for converting the first test script into a callback test script in the second language. The medium additionally includes instructions for compiling the second test script and the callback test script into a final test script in the second language as well as instructions for running a predetermined quantity of the final test scripts with a controller having an interface compatible with the second language.

Yet another embodiment of a method of generating a test script for use by a test agent also includes a computer readable medium having computer readable code thereon. The medium includes instructions for generating a first test script in a first language and instructions for converting the first test script into a second test script in a second language. The medium further includes instructions for converting the first test script into a callback test script in the second language. The medium further includes instructions for generating an intermediate test script in the first language from the first test script, converting the intermediate test script into a second test script in a second language, and converting the intermediate test script into a callback test script in the second language. The medium additionally includes instructions for compiling the second test script and the callback test script into a final test script in the second language as well as instructions for running a predetermined quantity of the final test scripts with a controller having an interface compatible with the second language.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides generation of atest script as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations for generating a test script as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Empirix Inc. of Bedford, Mass.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

A method and computer software for generating a test script for use by a test agent is presented. The method and computer software generate a first test script in a first language such as XML. An intermediate test script in XML is generated from the first test script in some embodiments. The intermediate test script, or the first test script when an intermediate test script has not been generated, is then converted into a second test script in a second language such as Java. Similarly, the intermediate test script or the first test script when an intermediate test script has not been generated, is also converted into a callback test script in the second language. The second test script and the callback test script are then compiled into a final test script in the second language. A predetermined quantity of the final test scripts are used to perform load testing of a web site with a controller having an interface compatible with the second language.

Figure 1:
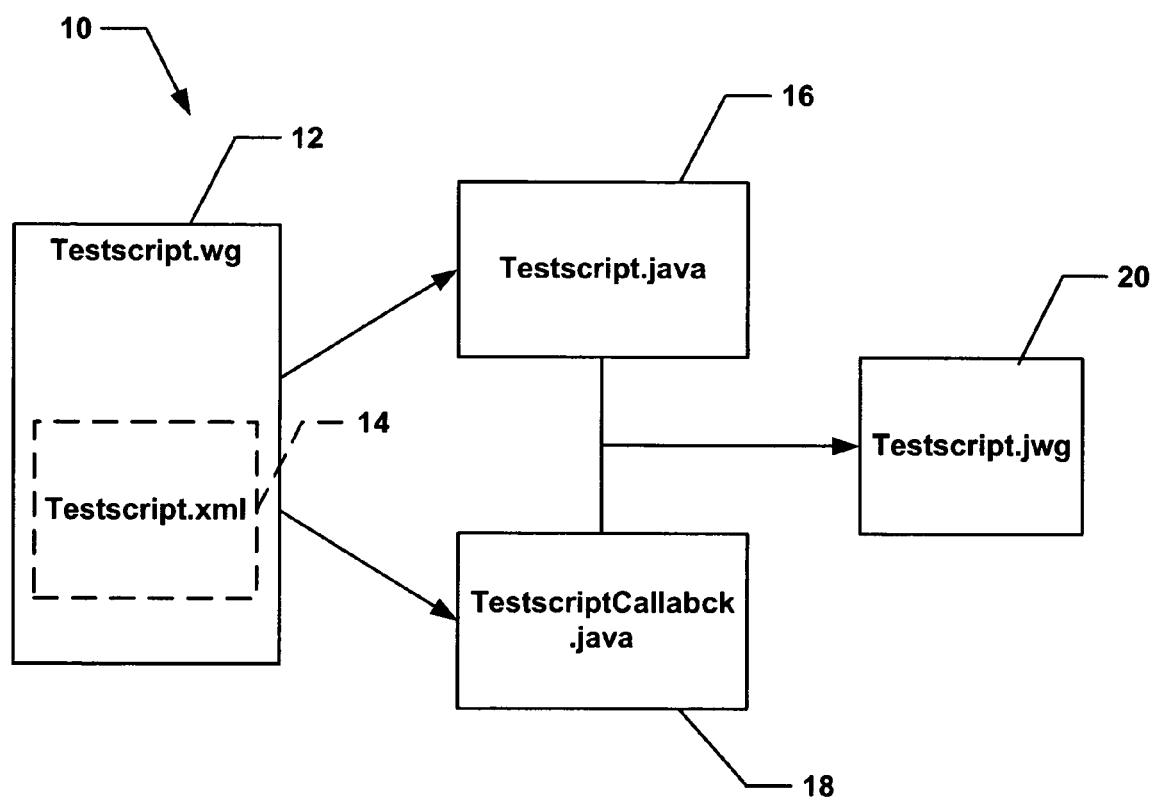
FIG. 1 is a block diagram of the different programs and test scripts used to provide a test script for use by a test agent in accordance with embodiments of the invention.

Referring now to FIG. 1, a particular embodiment of the relevant software test scripts and programs an environment 10 for generating a test agent script is shown. The environment 10 includes a first test script 12. The first test script 12 may have been generated manually or by way of an automated tool such as e-Test® available from Empirix Inc, of Bedford, Mass. The first test script 12 is in a first language such as eXtensible Mark-up Language (XML). The first test script 12 is shown having a name testscript.wg. In some embodiments, it may be desirable to create an intermediate test script 14. This is done to provide a more readable format version of the original test script. This intermediate test script is shown having the file name testscript.XML.

A second test script 16 is generated from either of the first test script 12 or the intermediate test script 14. When the original test script is in XML and the intermediate test script is in XML an eXtensible Stylesheet Language Transformer (XSLT) transformation can be used to generate the second test script 16. Similarly, a test script callback file 18 is also generated from either the first test script 12 or the intermediate test script 14. The test script callback program 18 is given the file name TestscriptCallback.Java.

The second test script 16 and the test script callback program 18 are compiled together in order to produce the final test script 20. The final test script is shown having the file name testscript.jwg. The final test script is used to perform testing, such as load testing, of a web site or web application.

Figure 2A:
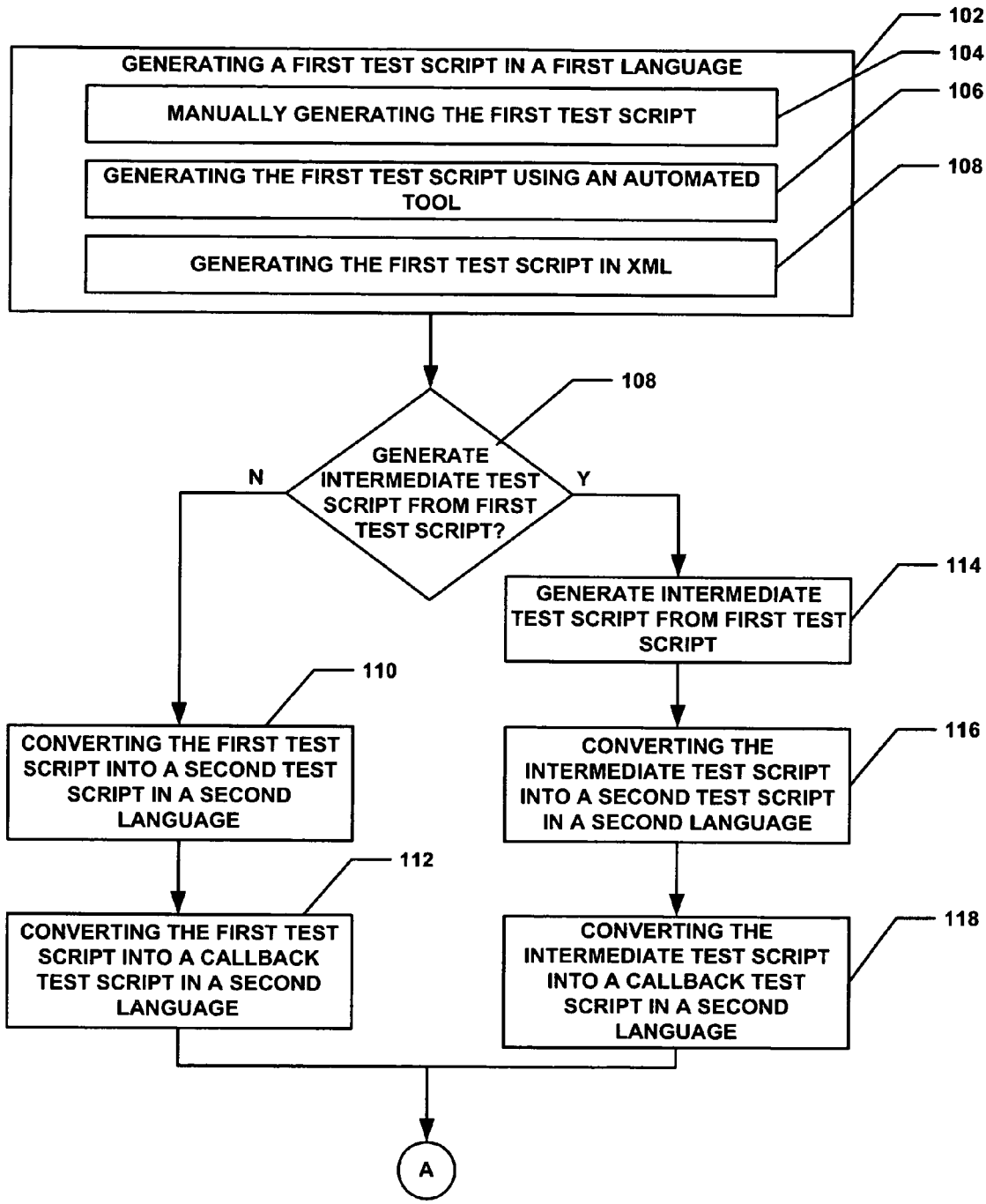
FIGS. 2A and 2B are flow diagrams of a method of providing a test agent architecture in accordance with embodiments of the invention.
Figure 2B:
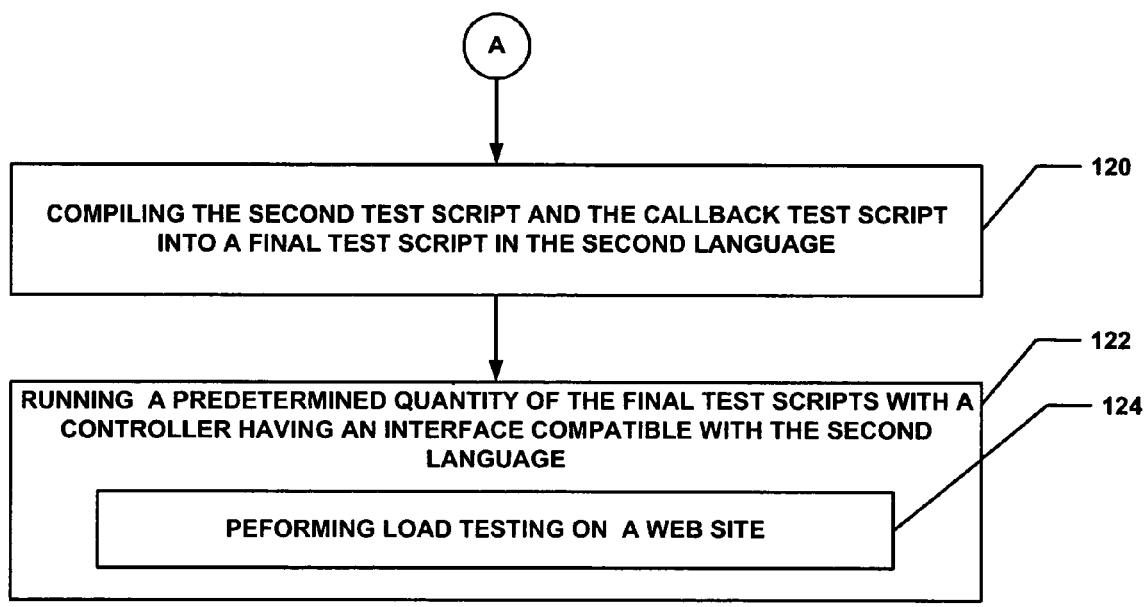

A flow chart of the presently disclosed method is depicted in FIG. 2. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 2 a flow diagram of a method for providing an agent test script is shown. The method 100 begins with processing block 102, wherein a first test script is generated in a first language.

In processing block 104, an intermediate test script is generated from the first test script. The intermediate test script is in the same language as the firs test script and is used provide a more readable format version of the original to script.

In processing block 106, the intermediate test script is converted into a second test script in a second language. The second language is different for the first language. For example the first test script may be in XML and the second to script is in Java.

In processing block 108, the intermediate test script is also converted into a callback test script. The callback test script is also in the second language.

In processing block 110, both the second test script and the callback test script are compiled into a final test script. The final test script is the same language as the second test script and the callback test script (e.g. Java).

In processing block 112, a predetermined quantity of the final test scripts are run with a controller having interface compatible with second language. Thus, load testing can be done on a web site with a test script generated in the above described manner.

Figure 3:
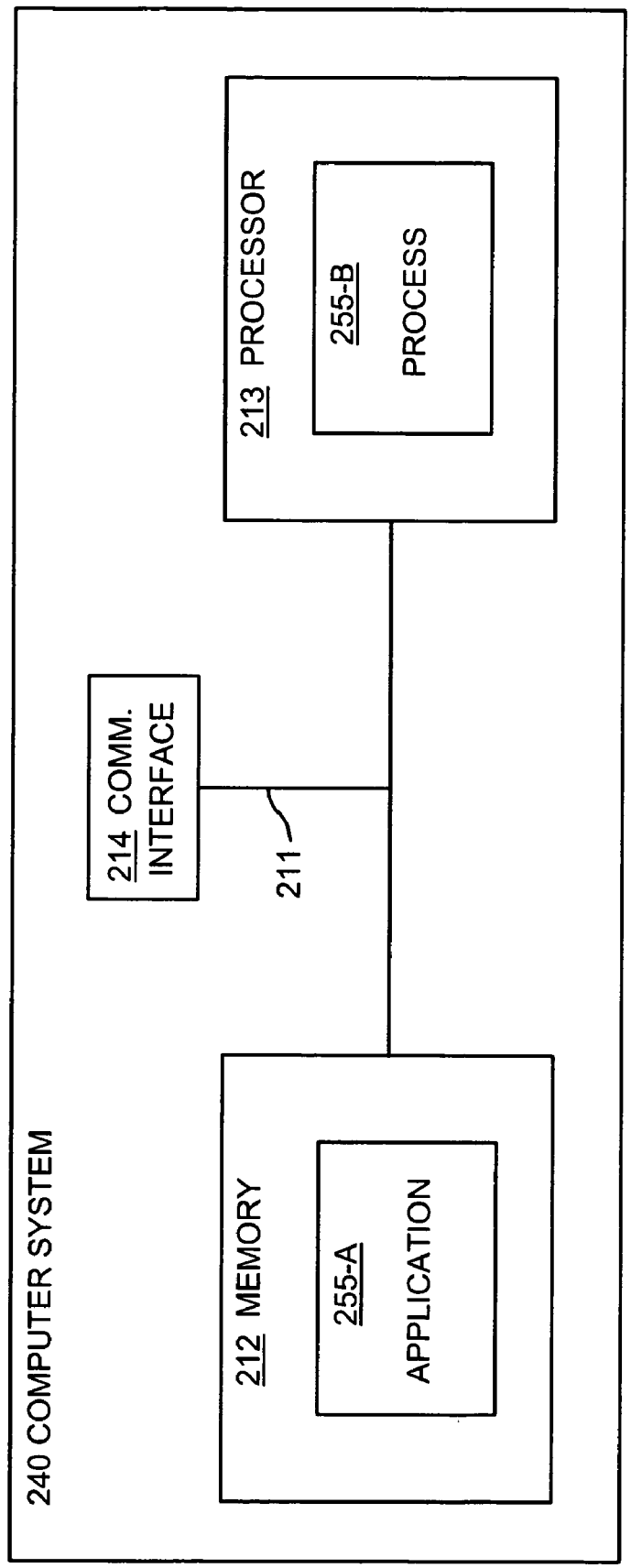
FIG. 3 illustrates an example computer system architecture for a computer system that performs generation of a test script for use by a test agent in accordance with embodiments of the invention.

FIG. 3 illustrates example architectures of a computer system that is configured as a host computer system 240. The computer system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention for the agent 255 as explained above. The processor 213 can access the memory system 212 via the interconnection mechanism 211 in order to launch, run, execute, interpret or otherwise perform the logic instructions of the applications 255-A for the host in order to produce a corresponding agent process 255-B. In other words, the agent process 255-B represents one or more portions of the agent application 255-A performing within or upon the processor 213 in the computer system.

It is to be understood that the agent 255 operate as explained in former examples are represented in FIG. 3 by the agent application 255-A and/or the process 255-B.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

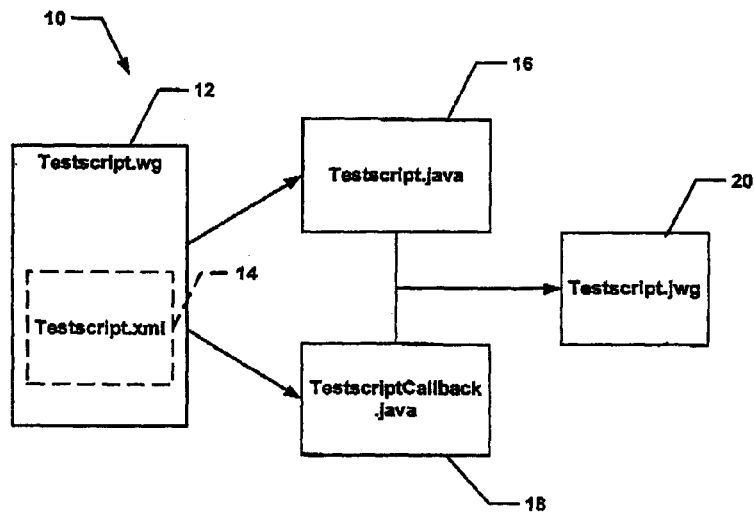

What is claimed is:

1. A method of generating a test script for use by a test agent, the method comprising:
generating a first test script in a first language;
making a determination whether to generate an intermediate test script from said first test script;
when the determination is made not to generate an intermediate test script then converting said first test script into a second test script in a second language, and converting said first test script into a callback test script in said second language;
when the determination is made to generate an intermediate test script then generating an intermediate test script in said first language from said first test script, converting said intermediate test script into a second test script in a second language, and converting said intermediate test script into a callback test script in said second language;
compiling said second test script and said callback test script into a final test script in said second language; and
running a predetermined quantity of said final test scripts with a controller having an interface compatible with said second language.

2. The method of claim 1 wherein said generating a first test script in a first language comprises generating said first test script in extensible Mark-up Language (XML).

3. The method of claim 1 wherein said compiling said second test script and said callback test script into a final test script in said second language comprises compiling said second test script and said callback test script in Java.

4. The method of claim 1 wherein said converting said first test script into a second test script in a second language and said converting said first test script into a callback test script in said second language comprises converting said first test script into a second test script in Java and converting said first test script into a callback test script in Java.

5. The method of claim 1 wherein said generating a first test script is done by one of the group comprising manually generating said first test script and generating said first test script using an automated tool.

6. The method of claim 2 wherein said converting into a second test script is performed using an eXtensbile Stylesheet Language Transformer (XSLT).

7. The method of claim 1 wherein said running comprises performing load testing on a web site.

8. A computer readable storage medium having computer readable code thereon for providing a test script for use by a test agent, the medium comprising:
  instructions for generating a first test script in a first language;
  instructions for making a determination whether to generate an intermediate test script from said first test script;
  instructions for when the determination is made not to generate an intermediate test script then converting said first test script into a second test script in a second language, and converting said first test script into a callback test script in said second language;
  instructions for when the determination is made to generate an intermediate test script then generating an intermediate test script in said first language from said first test script, converting said intermediate test script into a second test script in a second language, and converting said intermediate test script into a callback test script in said second language;
  instructions for compiling said second test script and said callback test script into a final test script in said second language; and
  instructions for running a predetermined quantity of said final test scripts with a controller having an interface compatible with said second language.

9. The computer readable medium of claim 8 wherein said instructions for generating a first test script in a first language comprises instructions for generating said first test script in extensible Mark-up Language (XML).

10. The computer readable medium of claim 8 wherein said instructions for compiling said second test script and said callback test script into a final test script in said second language comprises instructions for compiling said second test script and said callback test script in Java.

11. The computer readable medium of claim 8 wherein said instructions for converting said first test script into a second test script in a second language and said instructions for converting said first test script into a callback test script in said second language comprises instructions for converting said first test script into a second test script in Java and instructions for converting said first test script into a callback test script in Java.

12. The computer readable medium of claim 8 wherein said instructions for generating a first test script is done by one of the group comprising instructions for manually generating said first test script and instructions for generating said first test script using an automated tool.

13. The computer readable medium of claim 9 wherein said instructions for converting into a second test script is performed using an eXtensbile Stylesheet Language Transformer (XSLT).

14. The computer readable medium of claim 8 wherein said instructions for running comprises instructions for performing load testing on a web site.

15. A computer system comprising:
  a memory;
  a processor;
  a communications interface;
  an interconnection mechanism coupling the memory, the processor and the communications interface; and
  wherein the memory is encoded with a test script generation application that when performed on the processor, provides a process for processing information, the process causing the computer system to perform the operations of:
  generating a first test script in XML;
  generating an intermediate test script in XML from said first test script;
  converting said intermediate test script into a second test script in Java;
  converting said intermediate test script into a callback test script in Java; and
  compiling said second test script and said callback test script into a final test script in Java;
  running a predetermined quantity of said final test scripts with a controller having a Java compatible interface.

* * * * *

UNITED STATES PATENT AND TRADEMARK OFFICE
CERTIFICATE OF CORRECTION

PATENT NO. : 7,406,626 B2  Page 1 of 2
APPLICATION NO. : 11/150020
DATED : July 29, 2008
INVENTOR(S) : Shen et al.

It is certified that error appears in the above-identified patent and that said Letters Patent is hereby corrected as shown below:

Delete Title page showing an illustrative figure and substitute the attached title page therefor.

On Sheet 1 of 4, Reference Numeral 18, in Figure 1, lines 1-2, delete "TestscriptCallabck.java" and insert -- TestscriptCallback.java --, therefor.

In column 4, line 20, delete "fo ruse" and insert -- for use --, therefor.

In column 5, line 12, delete "atest" and insert -- a test --, therefor.

In column 6, line 38, delete "e-Test®" and insert -- E-test™ --, therefor.

In column 6, line 38, delete "Inc," and insert -- Inc., --, therefor.

In column 7, line 25, delete "firs" and insert -- first --, therefor.

In column 8, line 60, in Claim 2, delete "extensible" and insert -- eXtensible --, therefor.

In column 9, line 42, in Claim 9, delete "extensible" and insert -- eXtensible --, therefor.

Signed and Sealed this

Ninth Day of February, 2010

David J. Kappos
*Director of the United States Patent and Trademark Office*

(12) United States Patent
Shen et al.

(10) Patent No.: US 7,406,626 B2
(45) Date of Patent: Jul. 29, 2008

(54) TEST AGENT ARCHITECTURE

(75) Inventors: Lei Shen, Sudbury, MA (US); Richard C. Kuzsma, Jr., Nashua, NH (US); Michael Glik, Newton, MA (US)

(73) Assignee: Empirix Inc., Bedford, MA (US)

( * ) Notice: Subject to any disclaimer, the term of this patent is extended or adjusted under 35 U.S.C. 154(b) by 607 days.

(21) Appl. No.: 11/150,020

(22) Filed: Jun. 10, 2005

(65) Prior Publication Data

US 2006/0117222 A1 Jun. 1, 2006

Related U.S. Application Data

(60) Provisional application No. 60/627,492, filed on Nov. 12, 2004.

(51) Int. Cl.
*G06F 11/00* (2006.01)

(52) U.S. Cl. .................................. 714/38; 709/219
(58) Field of Classification Search ............ 714/37, 714/38, 39, 47
See application file for complete search history.

(56) References Cited

U.S. PATENT DOCUMENTS

| 6,470,383 | B1 * | 10/2002 | Leshem et al. | 709/223 |
| 6,477,483 | B1 * | 11/2002 | Scarlat et al. | 702/186 |
| 6,530,039 | B1 * | 3/2003 | Yang | 714/38 |
| 6,549,944 | B1 * | 4/2003 | Weinberg et al. | 709/224 |
| 6,560,564 | B2 * | 5/2003 | Scarlat et al. | 702/186 |
| 6,738,933 | B2 * | 5/2004 | Fraenkel et al. | 714/47 |
| 2005/0137844 | A1 * | 6/2005 | Voruganti | 704/2 |

* cited by examiner

*Primary Examiner*—Nadeem Iqbal
(74) *Attorney, Agent, or Firm*—Chapin IP Law, LLC; Barry W. Chapin, Esq.

(57) ABSTRACT

A method, apparatus and computer program product for generating a test script for use by a test agent is presented. A first test script is generated in a first language. A determination is then made whether to generate an intermediate test script from the first test script. When the determination is made not to generate an intermediate test script then the first test script is converted into a second test script in a second language, and the first test script is also converted into a callback test script. When the determination is made to generate an intermediate test script then an intermediate test script is generated from the first test script. The intermediate test script is converted into a second test script in a second language, and the intermediate test script is converted into a callback test script. The second test script and the callback test script are compiled into a final test script.

15 Claims, 4 Drawing Sheets